United States Patent
Boudebiza et al.

(10) Patent No.: US 11,225,317 B2
(45) Date of Patent: Jan. 18, 2022

(54) RADIAL SHAFT DEVICE FOR CONTROLLING THE PITCH OF FAN BLADES OF A TURBINE ENGINE HAVING AN UN-DUCTED FAN

(71) Applicant: SAFRAN AIRCRAFT ENGINES, Paris (FR)

(72) Inventors: Tewfik Boudebiza, Moissy-Cramayel (FR); Olivier Belmonte, Moissy-Cramayel (FR); Gilles Alain Marie Charier, Moissy-Cramayel (FR); Emmanuel Pierre Dimitri Patsouris, Moissy-Cramayel (FR); Pierre-Alain Jean Philippe Reigner, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 372 days.

(21) Appl. No.: 15/573,163

(22) PCT Filed: Apr. 29, 2016

(86) PCT No.: PCT/FR2016/051016
§ 371 (c)(1),
(2) Date: Nov. 10, 2017

(87) PCT Pub. No.: WO2016/181051
PCT Pub. Date: Nov. 17, 2016

(65) Prior Publication Data
US 2018/0065730 A1    Mar. 8, 2018

(30) Foreign Application Priority Data
May 12, 2015 (FR) ...................... 1554275

(51) Int. Cl.
*B64C 11/30*     (2006.01)
*B64D 27/00*    (2006.01)

(52) U.S. Cl.
CPC ...... *B64C 11/308* (2013.01); *B64D 2027/005* (2013.01); *Y02T 50/60* (2013.01)

(58) Field of Classification Search
CPC ................................ B64C 11/308; F01D 7/00
(Continued)

(56) References Cited

U.S. PATENT DOCUMENTS 1,979,616 A * 11/1934 Haidle .................. F03D 7/0224
                                                                416/89
2,029,503 A * 2/1936 Peterson ............... B64C 11/006
                                                                416/89

(Continued)

FOREIGN PATENT DOCUMENTS

GB        2492882 A    1/2013
WO   2010/136684 A1  12/2010

OTHER PUBLICATIONS

International Search Report dated Aug. 10, 2016 in PCT/FR2016/051016 filed Apr. 29, 2016.

*Primary Examiner* — David Hamaoui
*Assistant Examiner* — John S Hunter, Jr.
(74) *Attorney, Agent, or Firm* — Oblon, McClelland, Maier & Neustadt, L.L.P.

(57) ABSTRACT

A device for controlling pitch of fan blades of a turbine engine including an un-ducted fan, the device including: at least one set of fan blades of adjustable pitch, the set being constrained to rotate with a rotary ring centered on a longitudinal axis and mechanically connected to a turbine rotor, each blade of the set being mounted on a blade root support that is pivotally mounted on the rotary ring; and at least one radial control shaft adjusting pitch of at least two adjacent blades of the set, the control shaft being constrained (Continued)

to rotate with the rotary ring and being configured to pivot about an axis of the shaft, being coupled to the blade root supports of the at least two blades of the set to adjust their pitch via a transmission system including eccentrics connected together by at least one connecting rod.

7 Claims, 4 Drawing Sheets

(58) Field of Classification Search
USPC .................................................. 416/89, 104
See application file for complete search history.

(56) References Cited

U.S. PATENT DOCUMENTS

| | | | |
|---|---|---|---|
| 9,090,336 B2* | 7/2015 | Gallet | B64C 11/38 |
| 2012/0099987 A1 | 4/2012 | Belmonte et al. | |
| 2013/0017087 A1 | 1/2013 | Gallet | |

* cited by examiner

RADIAL SHAFT DEVICE FOR CONTROLLING THE PITCH OF FAN BLADES OF A TURBINE ENGINE HAVING AN UN-DUCTED FAN

BACKGROUND OF THE INVENTION

The present invention relates to the general field of turbine engines having one or two un-ducted fans, and more particularly to controlling the pitch of the fan blades of such engines.

A preferred field of application for the invention lies with turbojets having contrarotating propellers, also known as "open rotor jets", having two contrarotating propellers located either downstream from the gas generator in a "pusher" version or upstream in a "puller" version. Nevertheless, the invention also applies to turboprops having one or more propulsive propellers.

In a turbojet having contrarotating propellers, it is known that the pitch (or orientation) of the blades forming those propellers constitutes one of the parameters that can be used for managing the thrust of the turbojet, in particular by ensuring that the propeller always operates under the best possible conditions. Specifically, the propellers rotate at practically constant speed throughout all stages of operation, and it is the pitch of the propeller blades that varies thrust. This pitch serves in particular to enable the propeller to operate under the best possible conditions. Thus, during a cruising stage of flight, it is desired to obtain the lowest power possible on the turbine shaft needed for delivering given traction at a given speed of the airplane, so as to obtain the best efficiency (i.e. the efficiency that serves to minimize fuel consumption and to increase range). Conversely, during takeoff, it is desired to achieve the greatest possible traction in order to accelerate the airplane and then cause it to take off.

The mechanism for controlling the pitch of the blades of the propellers of the turbojet is generally integrated inside the hub carrying the propellers. More precisely, the pitch of each blade constituting the propellers is typically controlled by a rotary radial shaft that is connected via a motion transfer bearing to a stationary actuator centered on the longitudinal axis of the turbojet, the movement of the actuator rod giving rise to turning of the radial shaft about its axis. Reference may be made to Document WO 2013/050704, which describes an implementation of such control.

Furthermore, one of the solutions that have been envisaged for improving the propulsive efficiency of the propeller of a turbojet having contrarotating propellers, regardless of whether it is in a pusher version or a puller version, consists in reducing the hub ratio of the propellers, i.e. the ratio between the diameter measured at the lowest level of the propeller blades and the diameter measured level with their tips. Specifically, for the same given propeller diameter, the smaller the hub ratio, the greater the increase in propulsion efficiency and the greater the reduction in the associated fuel consumption.

Nevertheless, reducing the hub ratio of propellers presents a certain number of drawbacks. In particular, if the hub ratio decreases, it becomes more difficult or even impossible to mount the radial shaft for controlling the pitch of the blades from the inside of the hub carrying the propeller, as is usually done. In addition, the smaller the radius of the hub, the smaller the amount of space inside the hub, thereby making it impossible to position the radial shafts relative to one another.

OBJECT AND SUMMARY OF THE INVENTION

A main object of the present invention is thus to propose a device for controlling the pitch of blades that does not present the above-mentioned drawbacks.

This object is achieved by a device for controlling the pitch of fan blades of a turbine engine having an un-ducted fan, the device comprising at least one set of fan blades of adjustable pitch, said set being constrained to rotate with a rotary ring centered on a longitudinal axis and mechanically connected to a turbine rotor, each blade of the set being mounted on a blade root support that is pivotally mounted on the rotary ring, which device, in accordance with the invention, further comprises at least one radial control shaft for adjusting the pitch of at least two adjacent blades of the set, said control shaft being constrained to rotate with the rotary ring and being suitable for pivoting about an axis of the shaft while being coupled to the blade root supports of said at least two blades of the set in order to adjust their pitch via a transmission system comprising eccentrics connected together by at least one connecting rod.

The control device of the invention is remarkable in particular in that it makes provision to have recourse to have a common radial control shaft for adjusting the pitch of at least two adjacent fan blades. Such an arrangement makes it possible to introduce an offset (in the tangential direction) between the control shaft and the two adjacent fan blades of pitch under its control. Thus, the control shaft may be mounted from the outside of the rotary ring, rather than from its inside. Likewise, the total number of control shafts becomes much smaller than the total number of fan blades (reduction by a factor of 2 at least), thereby reducing problems of space occupation inside the rotary ring. As a result, by means of such an a arrangement, it is possible to reduce the hub ratio of the fan of the turbine engine, thereby increasing its propulsive efficiency and reducing the associated fuel consumption.

Furthermore, reducing the total number of control shafts by means of the device of the invention makes it possible to reduce the number of rotary casing arms through which these control shafts pass. Thus, the flow rate of gas passing through the passage crossed by the rotary casing arms is increased thereby.

Preferably, each transmission system is situated in the vicinity of the roots of said blades.

For each control shaft, the device may thus comprise a driving eccentric that is mounted at a top end of the control shaft, and a driven eccentric that is mounted on each of the two blade root supports and that is connected to the driving eccentric by at least one connecting rod.

Also preferably, the driving eccentric and the two driven eccentrics have centers of rotation forming a triangle (i.e. they are not mutually in alignment). By means of this provision, with an open rotor type turbojet, it is possible to create an axial offset between the wheel of control shafts and the set of fan blades, thereby making it possible to optimize mechanical integration of the device within the engine. In particular, because of this provision, in a turbine engine having two fans, it is possible to decorrelate the spacing between the two wheels of control shafts and the spacing between the two sets of fan blades, thereby reducing the length (and thus the weight) of the engine.

Alternatively, the driving eccentric and the two driven eccentrics may have centers of rotation that are in alignment in a common plane perpendicular to an axis of the engine.

The connecting rods of the device are preferably connected to the driving eccentric and to the driven eccentric by ball joint connections.

In an application to a turboprop having a single propeller, each transmission system may comprise a driving eccentric that is mounted at an outer end of the control shaft, and a respective driven eccentric that is mounted on each of the two blade root supports, the driven eccentrics being connected together by a connecting rod, and one of the driven eccentrics being connected to the driving eccentric by another connecting rod.

According to a provision, each control shaft is coupled to the blade root supports of at least three adjacent blades of the set in order to adjust their pitch, the root support of one of the blades being coupled to the control shaft by a system of fluting directly engaged with said control shaft, and the root support of the other two blades being coupled to the control shaft by the transmission system.

The device may also include an actuator centered on a longitudinal axis of the turbine engine and a transformation system for transforming the axial motion of the actuator into pivoting motion of each control shaft about its axis.

The invention also provides a turbine engine having an un-ducted fan, the turbine engine including at least one adjustable pitch fan blade set and at least one device for controlling the pitch of the blades as defined above.

BRIEF DESCRIPTION OF THE DRAWINGS

Other characteristics and advantages of the present invention appear from the following description made with reference to the accompanying drawings, which show embodiments having no limiting character. In the figures.

DETAILED DESCRIPTION OF THE INVENTION

Figure 1:
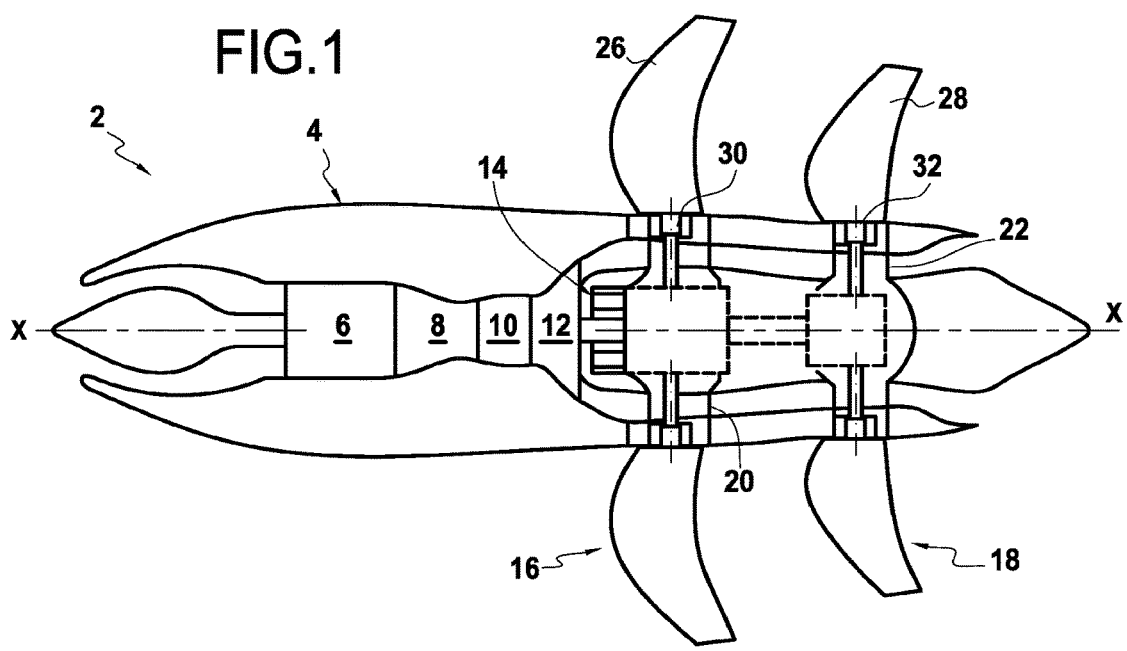
FIG. 1 is a diagrammatic longitudinal section view of a turbojet with contrarotating propellers to which the invention applies.

The invention applies to any turbine engine having at least one un-ducted fan, and in particular to turboprops having one or more propulsive propellers, and also to turbojets with contrarotating propellers (also known as open rotor jets) having two contrarotating propellers that may be placed upstream from the gas generator in a "puller" version, or downstream therefrom in a "pusher" version, like the turbojet 2 of the pusher type shown diagrammatically in FIG. 1.

In known manner, the turbojet 2 comprises from upstream to downstream in the flow direction of the gas stream inside a nacelle 4 of the turbojet: one or two compressors 6 (depending on the single or double spool architecture of the gas generator); a combustion chamber 8; a high pressure turbine 10 (or a high pressure turbine and an intermediate pressure turbine depending on said architecture); and a low pressure turbine 12 that acts via an epicyclic gearbox 14 to drive an upstream propeller 16 and a downstream propeller 18 in contrarotating manner, which propellers are aligned on a common axis, namely the longitudinal axis X-X of the turbojet, and are located downstream from the combustion chamber.

To this end, the upstream propeller 16 is secured to a rotary ring 20 centered on the longitudinal axis X-X of the turbojet and coupled to rotate with an outlet of the gearbox 14 so as to rotate in one direction, while the downstream propeller 18 is secured to another rotary ring 22 likewise centered on the axis X-X and coupled to rotate with another outlet of the gearbox 14 so as to rotate in the opposite direction. The way the outlets of the gearbox are coupled with the rotary rings of the propellers is known and is therefore not described in detail herein.

Furthermore, each of the blades 26 of the upstream propeller 16 and each of the blades 28 of the downstream propeller 18 presents a respective root that is mounted on a respective blade root support 30, 32, these blade root supports being pivotally mounted in the corresponding rotary ring 20, 22. Thus, pivoting of the blade root supports about the stacking axis of the blades they carry serves to adjust the pitch of the blades (which can also be referred to as the "orientation" of the blades).

The turbojet 2 also has a device of the invention for controlling the pitch of the blades of each propeller 16, 18. Such a device for controlling the pitch of the blades 26 of the upstream propeller 16 is shown diagrammatically in FIG. 2. Naturally, the same device applies equally well to controlling the pitch of the blades of the downstream propeller of the turbojet.

Figure 2:
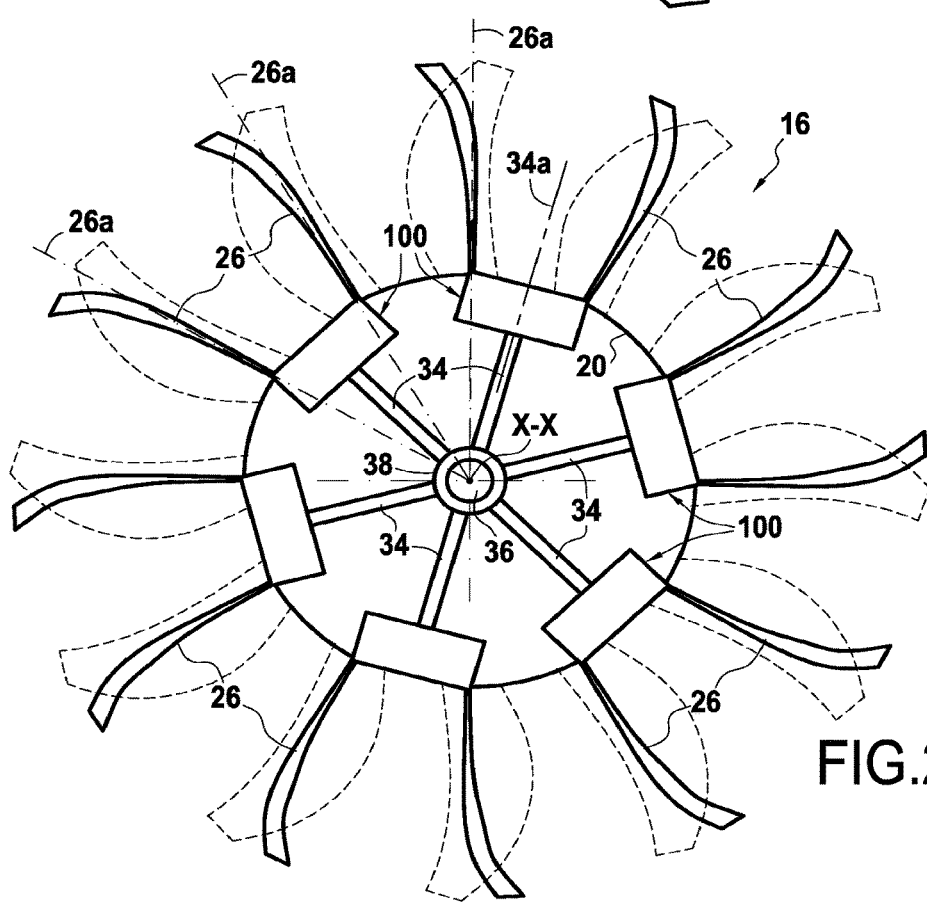
FIG. 2 is a kinematic diagram of a control device in an embodiment of the invention.

The control device comprises in particular a plurality of radial control shafts 34 (i.e. shafts that are arranged radially relative to the longitudinal axis X-X of the turbojet), each control shaft 34 being designed to adjust the pitch of at least two adjacent blades 26 of the upstream propeller 16. Thus, purely by way of illustration, FIG. 2 shows an upstream propeller having twelve blades 26 of pitch that is controlled by six radial control shafts 34.

The control shafts 34 for the upstream propeller 16 are constrained to rotate with the rotary ring 20 driving rotation of said propeller and on which the blade root supports 30 are mounted.

The control device also has means for causing each control shaft 34 to pivot about its axis 34a and relative to the rotary ring 20. The term "axis 34a" of the shaft is used herein to mean the axis of revolution of the cylindrical portion of said control shaft.

In a known embodiment, these means comprise in particular a stationary actuator 36 centered on the longitudinal axis X-X of the turbojet and a system for transforming the axial movement of the actuator into pivoting movements of each control shaft about its axis, e.g. a movement transfer bearing 38. Reference may be made to patent application WO 2013/050704, which describes an embodiment of such means for causing the control shaft to pivot about their axes.

French patent applications Nos. 15/54280 and 15/54279 filed by the Applicant on May 12, 2015, and entitled respectively "Arbre de commande radial pour dispositif de commande de l'orientation des pales de soufflante d'une turbomachine à soufflante non-carénée et procédé montage d'un tel arbre" [A radial control shaft for a device for controlling the pitch of fan blades of a turbine engine having an un-ducted fan, and a method of mounting such a shaft] and "Dispositif à bras de levier pour la commande de l'orientation des pales de soufflante d'une turbomachine à soufflante non carénée" [A lever arm device for controlling the pitch of fan blades of a turbine engine having an un-ducted fan] describe other variant embodiments of the coupling means for causing each control shaft 34 to pivot about its axis 34a.

The control device also includes transmission systems 100 for transmitting the pivoting movements of the control shafts 34 about their respective axes 34a into pivoting of the blade root supports of two adjacent blades of pitch controlled thereby.

Three variant embodiments of these transmission systems 100 are described below with reference to FIGS. 3A-3B, 4A-4B, and 5.

Figure 3A:
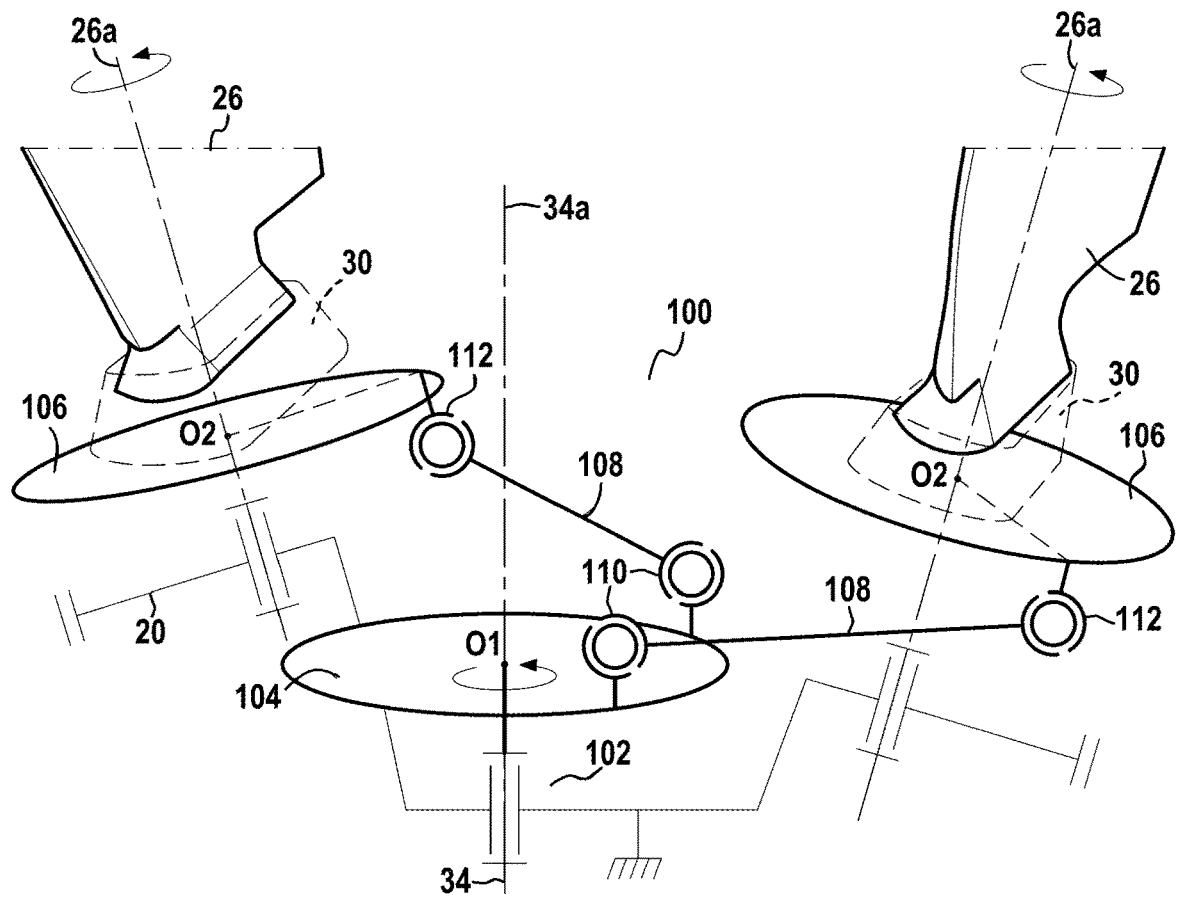
FIGS. 3A and 3B are fragmentary kinematic diagrams of the FIG. 2 control device in a first variant embodiment.
Figure 3B:
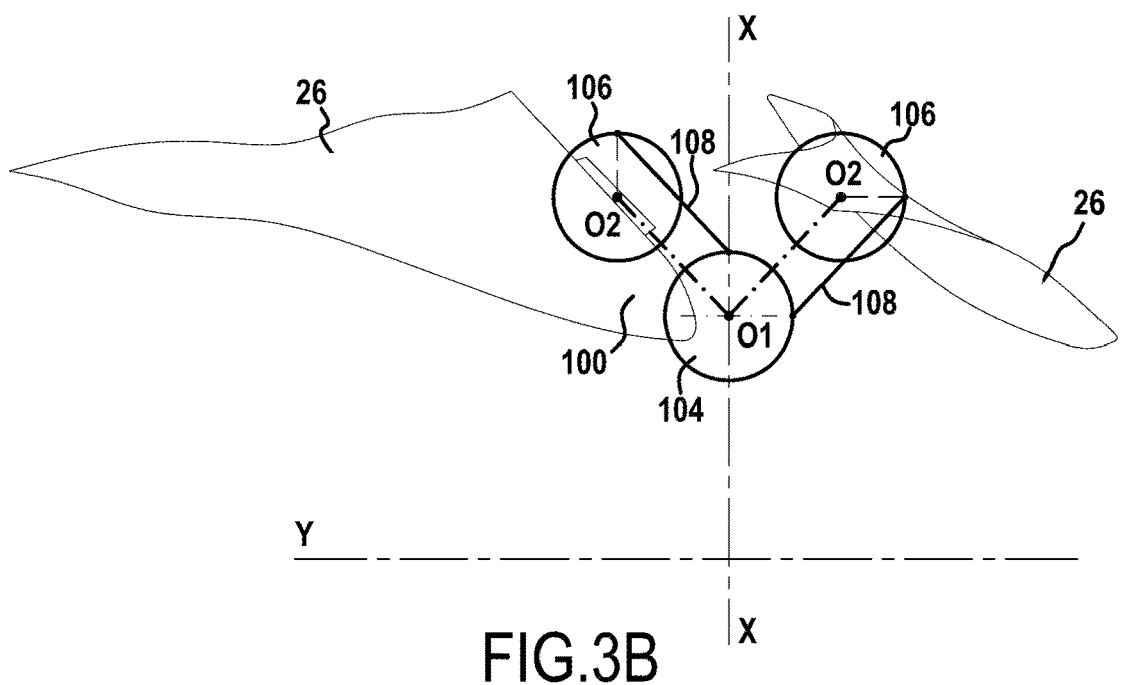

FIGS. 3A-3B show a first variant embodiment of the connectivity of a transmission system 100 for transmitting the pivoting movement of a control shaft 34 into pivoting movement of the blade root support 30 of two adjacent blades 26 of pitch controlled thereby.

In this first variant, the control shaft 34 passes through the rotary ring via a pivot connection 102. A driving eccentric 104 (represented in the figures by a turntable) is centered on an outer end of the control shaft, and the blade root support 30 of the two blades controlled thereby are each mounted on a driven eccentric 106 (likewise represented in the figures by a turntable).

Each driven turntable (or eccentric) 106 is connected to the driving turntable 104 by a connecting rod 108 by means of two ball joint connections 110 and 112 (one at each end of the connecting rod 108). The arrangement of the connecting rods 108 is configured in such a manner that pivoting of the driving turntable 104 about the axis 34a of the control shaft carrying it causes corresponding pivoting in the same direction of the two driven turntables (or eccentrics) 106 about their respective axes of revolution, which axes coincide with the stacking axes 26a of the corresponding blades. Thus, pivoting the control shaft 34 about its axis 34a leads to a change in the pitch (i.e. a change in the orientation) of the two adjacent blades 26 under its control.

As shown more precisely in FIG. 3B, the centers of rotation of the driving and driven turntables, respectively O1 for the driving turntable 104 and O2 for the driven turntables 106, in this first variant are not mutually in alignment (in a tangential direction Y-Y relative to the longitudinal axis X-X of the turbojet). On the contrary, these centers of rotation form a triangle with vertices being the centers of gravity O1, O2 of these turntables 104, 106.

In other words, the centers O2 of the driven turntables 106 and the center O1 of the driving turntable 104 are situated respectively on a common first plane perpendicular to the axis of the engine and on a second plane that is axially offset relative to the first plane. The three centers of the turntables thus form an isosceles triangle and the connecting rods are of length substantially equal to the side of the isosceles triangle such that the system makes it possible to obtain symmetrical (or quasi-symmetrical) pivoting movement between two consecutive blades.

Thus, the wheel carrying the control shafts 34 for the upstream propeller 16 of the turbojet can be offset axially (along the longitudinal axis X-X) relative to the upstream propeller. By likewise applying an axial offset for the downstream propeller 18 of the turbojet, it is thus possible to decorrelate the spacing between the two wheels of control shafts and the spacing between the two sets of fan blades. This latitude makes it possible to optimize mechanical integration of the control device of the invention within the turbojet. In particular, in this first variant, it is possible to reduce the length (and thus the weight) of the engine.

Figure 4A:
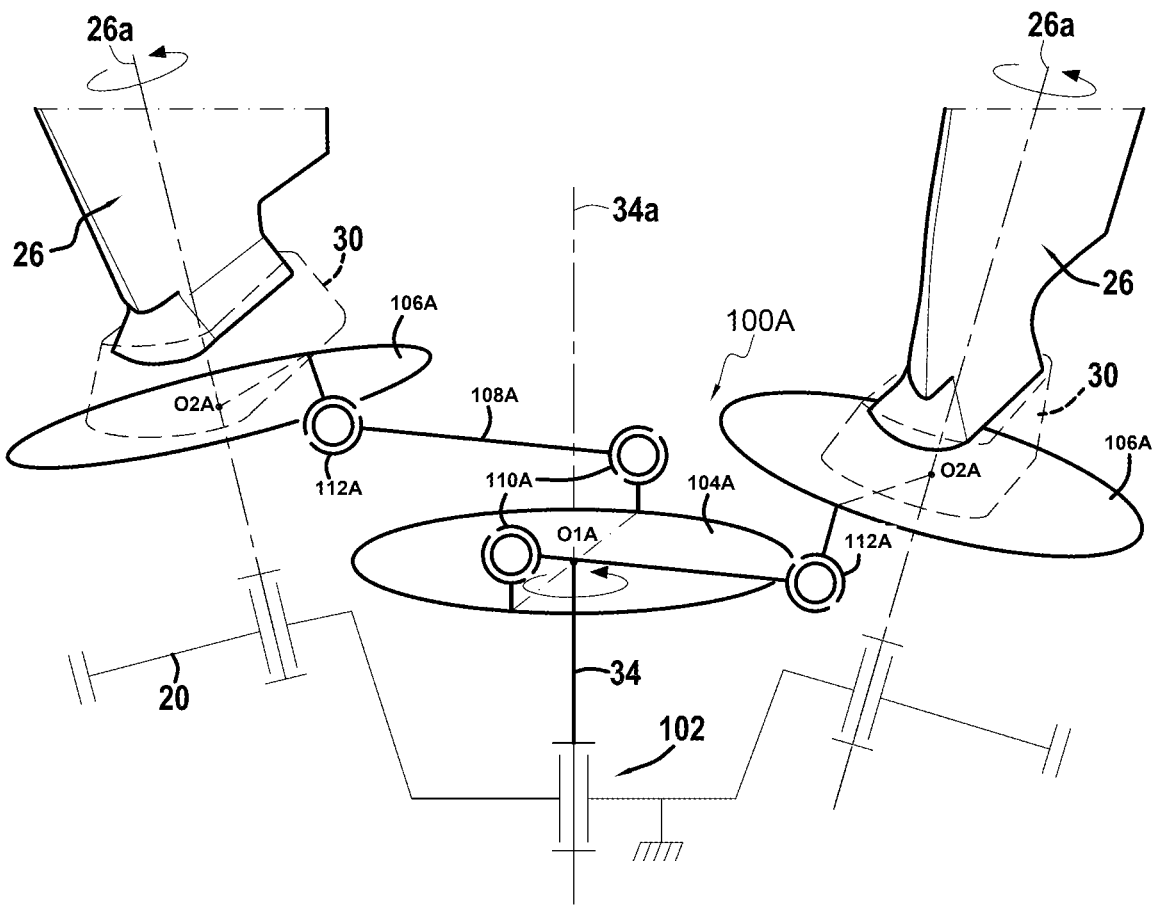
FIGS. 4A and 4B are fragmentary kinematic diagrams of the FIG. 2 control device in a second variant embodiment.
Figure 4B:
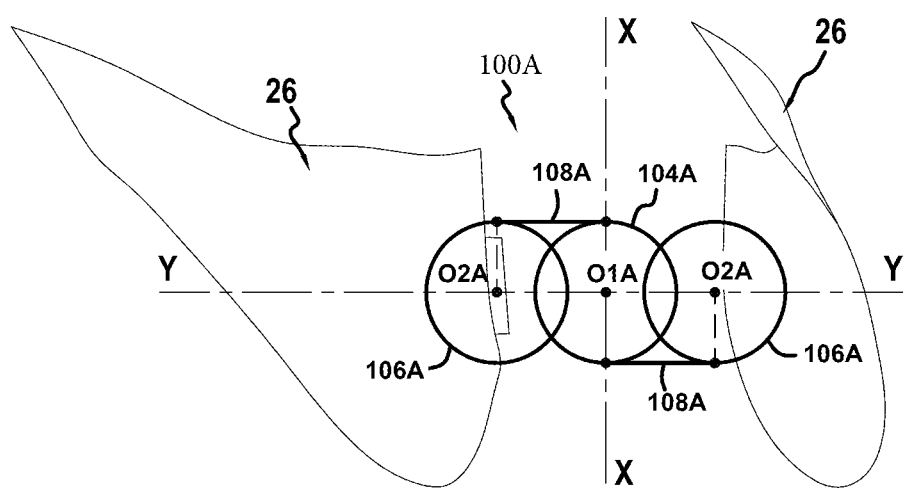

FIGS. 4A-4B show a second variant embodiment of the connectivity of a transmission system 100A for transmitting the pivoting movement of a control shaft 34 into pivoting movements of the blade root supports 30 of two adjacent blades 26 of pitch controlled thereby.

The second variant embodiment differs from the above-described first variant embodiment in that the center of rotation O1A of the driving turntable (or eccentric) 104A and the centers of rotation O2A of the two driven turntables (or eccentrics) 106A are in alignment on a common straight line (relative to the tangential direction Y-Y, see FIG. 4B), in other words, the centers of rotation lie in a common plane perpendicular to the axis of the engine.

As in the first variant, each driven turntable 106A is connected to the driving turntable 104A by a connecting rod 108 by means of two ball joints 110A, 112A (one at each end of the connecting rod 108A).

The arrangement of these connecting rods 108A is also configured in such a manner that pivoting of the driving turntable 104A about the axis 34a of the control shaft 34 carrying it gives rise to corresponding pivoting in the same direction of the two driven turntables 106A about the pitch axes 26a of the corresponding blades 26. Thus, pivoting the control shaft 34 about its axis 34a causes a change to the pitch (i.e. a change to the orientation) of the two adjacent blades 26 under its control.

Figure 5:
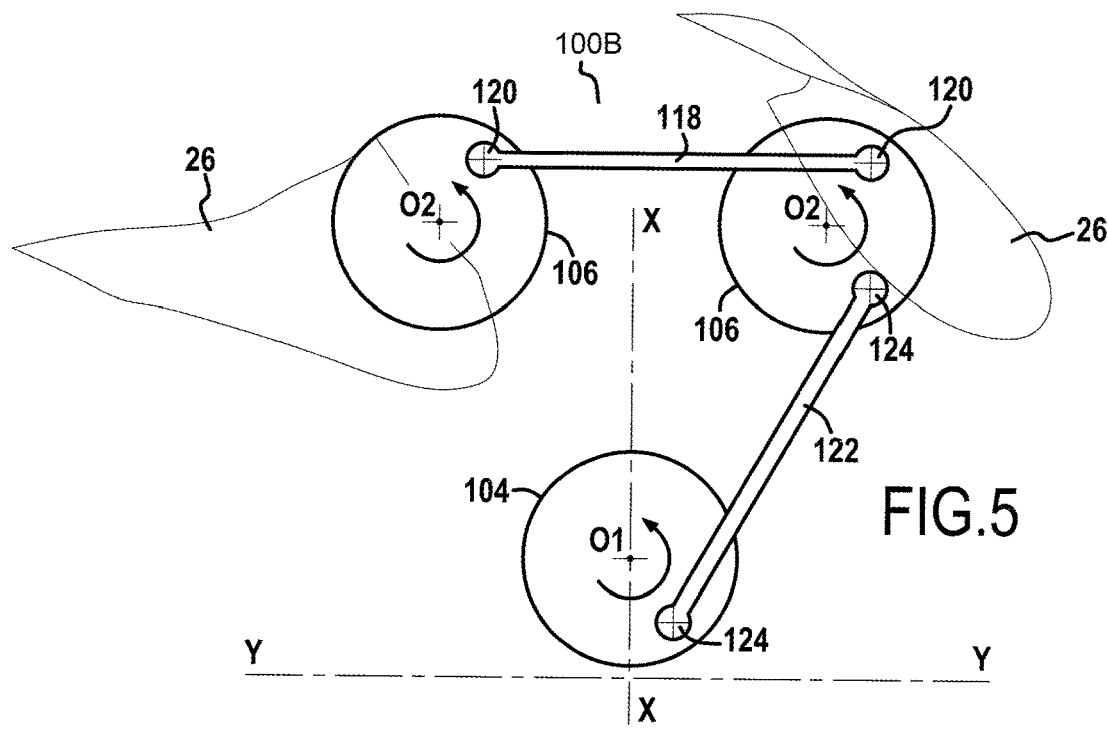
FIG. 5 is a fragmentary kinematic diagram of a control device in a third variant embodiment applicable more particularly to controlling the pitch of the blades of a single propeller of a turbojet.

FIG. 5 is a diagram showing a third variant embodiment for the connectivity of a transmission system 100B for transmitting pivoting movement from a control shaft into pivoting of the blade root supports of two adjacent blades 26 of pitch control thereby.

This third variant applies more particularly to controlling the pitch of blades of a single turbojet propeller.

In this third variant embodiment, the transmission system 100B comprises, for each control shaft, a driving turntable (or eccentric) 104 that is mounted at an outer end of the control shaft, and a driven turntable (or eccentric) 106 that is mounted on each of the two blade root supports of two adjacent blades.

The driven turntables 106 in this example are connected together by a first connecting rod 118 (via ball joint connections 120), and one of the driven turntables is connected to the driving turntable 104 by a second connecting rod 122 (likewise via ball joints 124).

The arrangement of the connecting rods 118 and 122 is configured so that pivoting of the driving turntable 104 about the axis of the control shaft carrying it leads to corresponding pivoting in the same direction of the driven turntable 106 that is directly coupled to the driving turntable by the second connecting rod 122, which pivoting causes corresponding pivoting in the same direction of the other driven turntable 106 by the first connecting rod 118.

As a result, pivoting of the control shaft about its axis leads to a change in the pitch (or a change in the orientation) of the two adjacent blades 26 under its control.

It should be observed in this example that the centers of rotation of the driving and driven turntables, respectively O1 for the driving turntable 104, and O2 for the driven turntables 106, are not mutually in alignment (i.e. there is axial offset present between the axes of rotation of the control shafts, and the axis of the propeller).

In the three above-described variant embodiments, it should be observed that the transmission system with eccentrics connected together by connecting rods enables the positions of fan blades to be modified relative to the position of the control shaft relatively late in the design of the control device. Specifically, merely by modifying the lengths of the connecting rods connecting the eccentrics together, it is possible to go from the first variant embodiment of FIGS. 3A-3B to the second variant embodiment of FIGS. 4A-4B (which modification can be obtained in particular without modifying the positions of the control shaft, nor the position of the actuator). Thus, such a transmission system permits a certain amount of flexibility in the design of the control device.

Figure 6:
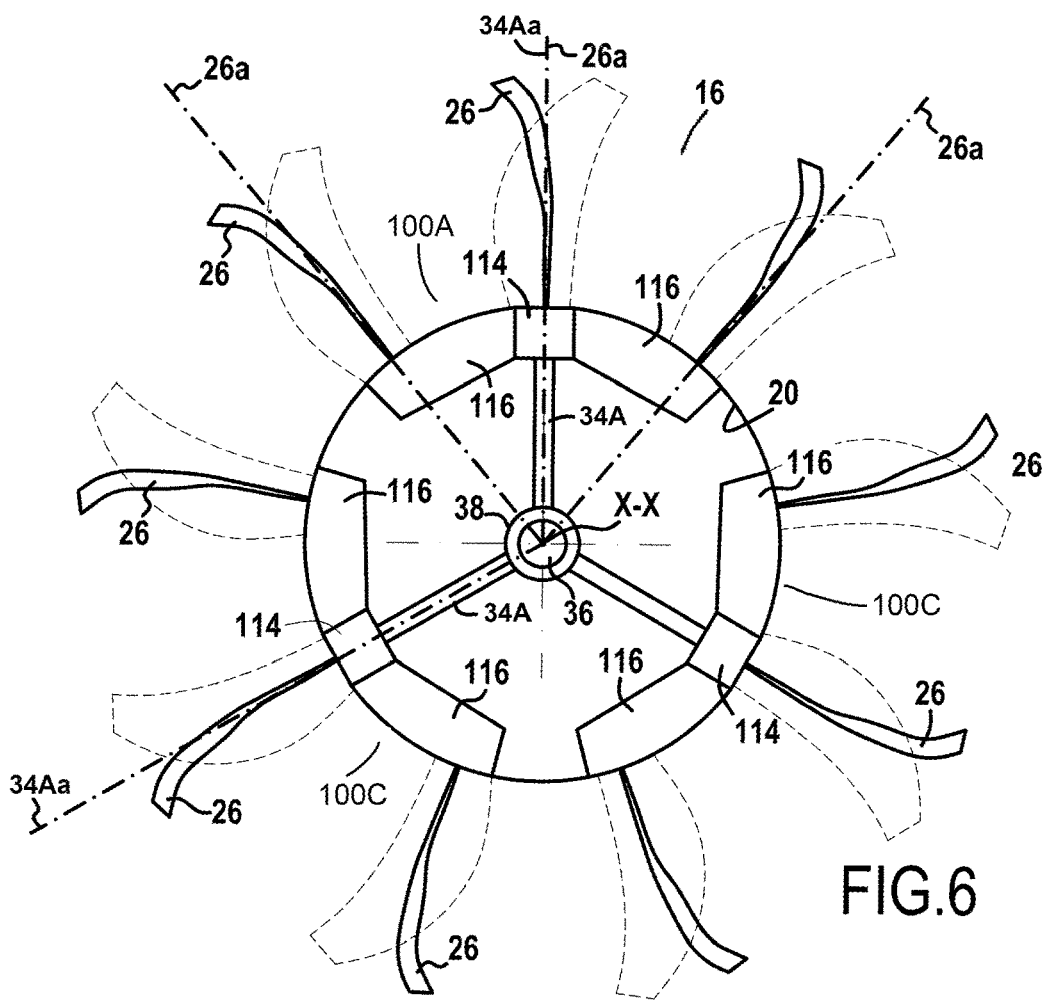
FIG. 6 is a kinematic diagram of a control device in another embodiment of the invention.

FIG. 6 is a schematic diagram of a control device in another embodiment of the invention.

In this other embodiment, which is equally applicable to the upstream propeller 16 of the turbojet or to its downstream propeller, the control device likewise comprises a plurality of radial control shafts 34C, with the difference being that in this example each control shaft 34C is coupled to the blade root supports of three adjacent blades 26 of the propeller 16 in order to adjust their pitch (i.e. change their orientation).

Thus, purely by way of illustration, FIG. 6 shows an upstream propeller 16 having nine blades 26 of pitch that is controlled by three radial control shafts 34C. These control shafts 34C are constrained to rotate with the rotary ring 20 that drives the propeller 16 in rotation and that has the blade root supports mounted thereon (not shown in FIG. 6).

The means for causing each control shaft 34C to pivot about its axis 34Aa and relative to the control ring 20 are identical to the means described with reference to the preceding embodiment, i.e. they may comprise for example a stationary actuator 36 centered on the longitudinal axis X-X of the turbojet and a motion transfer bearing 38 for transforming the axial movement of the actuator 36 into pivoting movement of each control shaft 34C about its axis.

It should be observed that for a given triplet of adjacent blades 26 of pitch controlled by a single control shaft 34C, the control shaft is radially positioned in such a manner that its axis 34Aa coincides with the pitch axis 26a of one of the blades.

The control device also has transmission systems 100A for transmitting pivoting movement of the control shafts 34C about their respective axes 34Aa into pivoting of the blade root supports of all three blades of pitch controlled thereby.

To this end, for each control shaft 34C, the blade root support having its pitch axis 26a coinciding with the axis 34Aa of the control shaft is coupled to said shaft by a system 114 of fluting engaging directly with the shaft, and the root supports of the other two blades directly adjacent to the preceding blades are coupled to the control shaft by systems 116 of driving/driven eccentrics and connecting rods.

The system 114 whereby fluting carried by the top end of the control shaft 34C engages corresponding fluting carried by the blade root support is known to the person skilled in the art. The system 116 comprises a mechanism substantially identical to that described with reference to FIGS. 4A-4B in which the top end of the control shaft carries a driving turntable (or eccentric) centered on the axis 34Aa of the shaft, the driving turntable being coupled (via ball joint connections) to two driven turntables (or eccentrics) each connected to a respective one of two adjacent blades of the triplet of blades.

Thus, a movement of the control shaft 34C about its axis 34Aa leads to a modification to the pitch (or a change of orientation) of the three adjacent blades under its control, either via the fluting system 114, or else via the system 116 of driving/driven eccentrics and connecting rods.

The invention claimed is:

1. A device for controlling pitch of fan blades of a turbine engine including an un-ducted fan, the device comprising:
at least one set of fan blades of adjustable pitch, the at least one set of fan blades being constrained to rotate with a rotary ring centered on a longitudinal axis and mechanically connected to a turbine rotor, wherein each blade of the at least one set of fan blades is mounted on a blade root support, the blade root support being pivotally mounted on the rotary ring; and
at least one radial control shaft, wherein each of the at least one radial control shaft is coupled to the blade root support of each of at least two adjacent blades of the at least one set of fan blades via a transmission system,
wherein the transmission system comprises a driving eccentric mounted at a top end of the at least one radial control shaft and a driven eccentric mounted on the blade root support of each of the at least two adjacent blades, wherein each driven eccentric is connected to the driving eccentric by at least one connecting rod,
wherein each of the at least one radial control shaft adjusts a pitch of at least two adjacent blades of the at least one set of fan blades, the at least one radial control shaft being constrained to rotate with the rotary ring and configured to pivot about an axis of the radial control shaft while being coupled to the blade root supports of the at least two blades of the at least one set of fan blades to adjust the pitch of the at least two adjacent blades,
wherein the driving eccentric mounted at the top end of the at least one radial control shaft is directly connected to each driven eccentric of each of the at least two adjacent blades by the at least one connecting rod.

2. The device according to claim 1, wherein each transmission system is situated adjacent roots of the blades.

3. The device according to claim 2, wherein the driven eccentric mounted on the blade root support of each of the at least two adjacent blades is connected to the driving eccentric by two connecting rods of the at least one connecting rod.

4. The device according to claim 3, wherein the driving eccentric and each driven eccentric have centers of rotation forming a triangle.

5. The device according to claim 3, wherein the driving eccentric and each driven eccentric of each of the at least two adjacent blades have axes of rotation that are in alignment in a common plane perpendicular to the longitudinal axis of the turbine engine.

6. The device according to claim 3, wherein the at least one connecting rod is connected to the driving eccentric and to each driven eccentric of each of the at least two adjacent blades by ball joint connections.

7. A turbine engine including an un-ducted fan, the turbine engine comprising the at least one set of fan blades of adjustable pitch and at least one said device for controlling pitch of the fan blades according to claim 1.

* * * * *